United States Patent [19]
Weng et al.

[11] Patent Number: 5,572,588
[45] Date of Patent: Nov. 5, 1996

[54] METHOD AND APPARATUS FOR DETECTING RECEPTION OF A TONE SIGNAL

[75] Inventors: Chia-Shiann Weng; Kenneth C. Weng, both of Austin, Tex.

[73] Assignee: Motorola, Inc., Schaumburg, Ill.

[21] Appl. No.: 270,349

[22] Filed: Jul. 5, 1994

[51] Int. Cl.$^6$ .................................................. H04M 11/04
[52] U.S. Cl. .............................. 379/386; 379/58; 379/59; 379/63; 379/283
[58] Field of Search ..................................... 379/386, 351, 379/58, 59, 63, 60, 61, 283; 375/328, 329, 330, 331; 455/33.2, 54.1

[56] References Cited

U.S. PATENT DOCUMENTS 5,131,019 7/1992 Sheffer et al. ............................ 379/39
5,134,708 7/1992 Marui et al. ............................... 379/63
5,313,170 5/1994 Kojima ...................................... 329/360

*Primary Examiner*—Krista M. Zele
*Assistant Examiner*—Jacques M. Saint-Surin

[57] ABSTRACT

Tone detection may be accomplished by receiving an in-phase signal component 203 and a quadrature signal component 204. These components are then sampled to produce a plurality of sampled in-phase signal components 207 and a plurality of sampled quadrature signal components 208. The sampled in-phase signal components 207, or the sampled quadrature signal components 208, are then shifted by a pre-determined phase angle to produce a plurality of shifted components. Having shifted these signals, the shifted signals, or at least a set of them, are compared with the opposite non-shifted sampled signals, or a set thereof. When each of the shifted signal components substantially match the opposite non-shifted signal components, a tone signal is being received.

16 Claims, 5 Drawing Sheets

METHOD AND APPARATUS FOR DETECTING RECEPTION OF A TONE SIGNAL

TECHNICAL FIELD OF THE INVENTION

This invention relates generally to signal detection and, in particular, to detection of a tone signal within a cellular telephone.

BACKGROUND OF THE INVENTION

Cellular telephones are known to utilize a tone signal to indicate the beginning of a TDM-Frame as well as to transmit data. The tone signal is generally of a sinusoidal nature which can be readily detected by a tone detection circuit. FIG. 1 illustrates a prior art toned detection circuit that includes a sampler 101, an analog-to-digital converter 103, a high pass filter 104, and adaptive band pass filter 105, a pole adapter 106, a first and second energy estimators 107–108, a gain adapter 109, and a tone detection counter 110. In operation, the sampler 101 receives a signal 100 and demodulates it in to an in-phase signal component 102. The in-phase signal component 102 is then sampled by the A-D converter 103 at four times the input signal rates. The resulting sampled signal is then passed through a high pass filter 104 and inputted to an adaptive band-pass filter 105.

The adaptive band-pass filter 105 is controlled by the gain adapter 109 based on an energy comparison between the energy of the input signal to the adaptive band-pass filter 105 and the energy of the output signal of the adaptive band-pass filter 105 as determined by the energy estimators 107–108. This energy comparison is performed approximately 160 times, wherein for each of these comparisons, the center frequency of the adaptive band-pass filter 105 is adjusted. When the energy estimator 107 and energy estimator 108 sense approximately the same energy, the frequency of the input signal 100 is determined.

Once the input signal frequency is determined, the tone detection counter 110 is incremented. The tone detection count is used to verify that an actual tone signal is being received, in that, a tone signal is several cycles, where each cycle can be counted.

While the above described tone detection circuit accurately detects when a cellular telephone is receiving a tone signal, the implementation is quite comprehensive. In practice, this type of tone circuit is implemented in a dedicated digital signal processor (DSP) or a microprocessor (μP). To detect a tone signal, the DSP, or μP, executes 14,400 cycles, 90 cycles for each of the 160 energy comparisons. Because of the large number of execution cycles needed to detect a tone signal, the DSP, or μP, consumes a considerable amount of current, i.e., in the order of 5–20 mA.

In cellular telephones, the customer driven technological trend is to extend the battery life by reducing current drain requirements. Because of the current requirements of the above mentioned prior art tone detection circuit, cellular telephone battery life is not optimized. Therefore, a need exists for a tone detection circuit that reduces the number of cycle steps required to determine tone detection, thus reducing power consumption and reducing the cost for the DSP, or μP, because a less powerful device can be used.

DETAILED DESCRIPTION OF THE PREFERRED EMBODIMENT

Generally, the present invention provides a method and apparatus for detecting the receipt of a tone signal. This is generally accomplished by receiving an in-phase signal component and a quadrature signal component. These components are then sampled to produce a plurality of sampled in-phase signal components and a plurality of sampled quadrature signal components. The sampled in-phase signal components, and/or the sampled quadrature signal components, are then shifted by a pre-determined phase angle to produce a plurality of shifted components. Having shifted these signals, the shifted signals, or at least a set of them, are compared with the non-shifted sampled opposite signals, or a set thereof. For example, when the sampled in-phase signal components are shifted, the shifted in-phase signal components are compared to the sampled quadrature signal components and visa versa. When each of the shifted signal components substantially match the corresponding non-shifted sampled signal components, the tone signal is being received. With such a method and apparatus, the number of processing steps required to indicate tone detection is substantially reduced thus, power consumption is reduced and the cost is reduced because a less powerful DSP or μP may be used.

Figure 2:
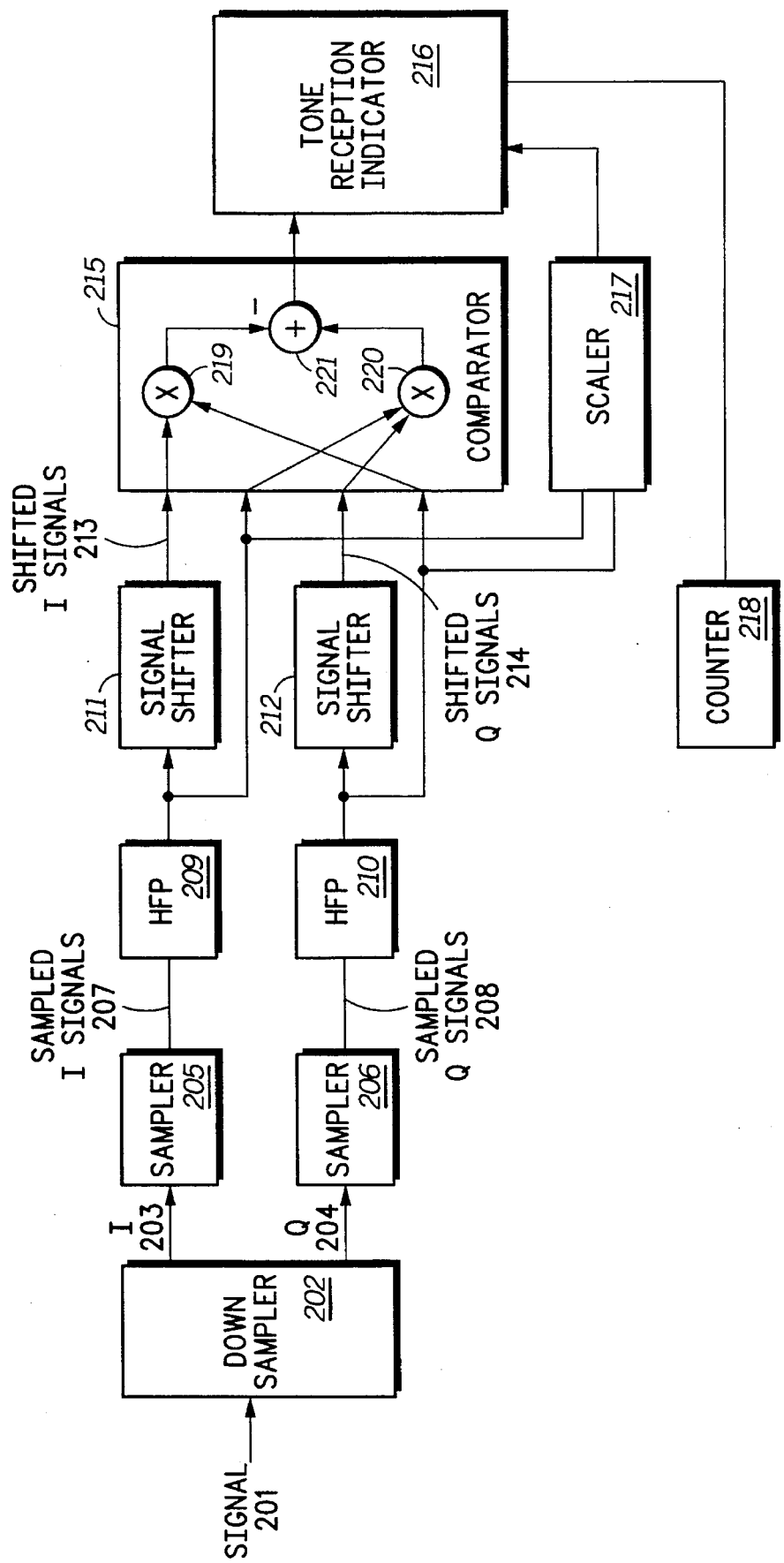
FIG. 2 illustrates a tone detection circuit in accordance with the present invention.

The present invention can be more fully described with reference to FIGS. 2–5. FIG. 2 illustrates a tone detection circuit 200 which includes a down sampler 202, a first and second sampler 205 206, a first and second high pass filter 209 210, a first and second signal shifter 211 212, a comparator 215, a tone reception indicator 216, a scalar 217, and a counter 218. In operation, the tone detection circuit 200 receives a signal 201 which may comprise a sinusoidal signal, or a complex sinusoidal signal, such as speech, or noise which is a random signal. Regardless of which type signal is received, the down sampler 202, which may be a demodulator, down converts the signal 201 into an in-phase signal component 203 and a quadrature signal component 204. Typically, the down conversion is to base band, but may be at any intermediate frequency without deviating from the spirit of the invention.

The in-phase and quadrature signal components 203 and 204 are then sampled via samplers 205 and 206. Samplers 205 and 206 may be any type of sampler that provides an oversampling of an analog input signal. For example, the samplers 205 206 may be analog to digital converters which have at least a four times sampling rate. The resultants from the samplers 205 and 206 are a plurality of sampled in-phase signal components 207 and a plurality of sampled quadrature signal components 208. The plurality of sampled in-phase signal components 207 and the plurality of sampled quadrature signal components 208 are then passed through high pass filters 209 210, which may be any type of digital high pass filter.

Having filtered the plurality of sampled in-phase and quadrature signal components 207 208, at least one of the plurality of sampled signal components is shifted via the signal shifters 211 or 212. The signal shifters 211,212 may be any type of delay device which provides a predetermined delay angle such as 90°, or π/2, such as a digital delay. While FIG. 2 illustrates two signal shifters 211 212, it should be readily apparent that only one signal shifter is required to gain the benefits of the present invention, however, performance is enhanced with using the dual shifters as shown.

Once the plurality of sampled signals 207 208 have been shifted to produce shifted in-phase signal components 213 and shifted quadrature signal components 214, the comparator 215 compares the shifted in-phase signal components 213 with the sampled quadrature signal components 208 and compares the shifted quadrature signal components 214 with the sampled in-phase signal components 207. The comparisons, which are performed by multipliers 219 and 220, are then compiled via summer, or adder, 221 to produce a resultant. The resultant is then received by the tone reception indicator 216 which compares the resultant to a predetermined tone indication threshold. If the resultant is within a tolerance threshold of the predetermined tone indication threshold, the tone reception indicator 216 sends a signal to the counter 218 indicating that a tone signal is presently being received. Upon receiving the signal, the counter 218 is incremented. When the counter 218 reaches a predetermined value, or count, such as 10 to 100 cycles, tone signal reception is indicated.

FIG. 2 further illustrates a scalar 217. The scalar 217 is provided to normalize the resultant provided to the tone reception indicator 216, where variations in the resultant occur due to varying magnitudes of the input signal 201. The varying magnitude of the input signal 201 occurs due to the geographic relationship between the tone detection circuit 200 and an RF source of the input signal. The closer the tone detection circuit 200 is to the RF source, the larger the magnitude of the input signal 201. Conversely, the further the tone detection circuit 200 is from the RF source, the smaller the magnitude of the input signal 201. Thus, the scalar 217 measures the average power level of the input signal 201 and normalizes the resultant provided to the tone detection indicator 216 based on the average power level. For example, if the predetermined tone indication threshold is set for one voltage, the resultant is normalized based on an average power level of the input signal of one voltage. Further discussion of the tone detection circuit 200 will be provided below with reference to FIG. 4.

Figure 3:
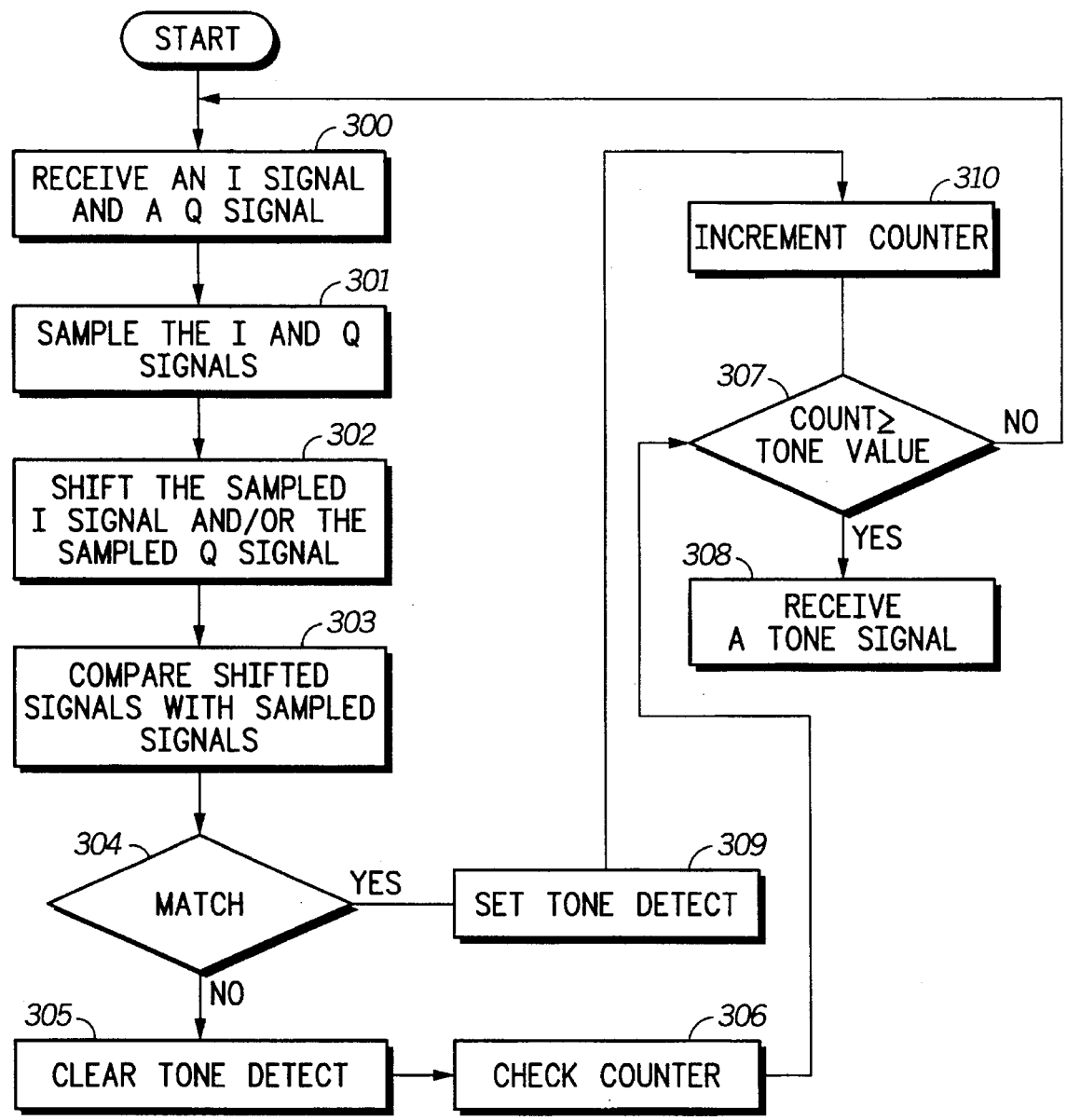
FIG. 3 illustrates a logic diagram that may be used to implement the present invention.

FIG. 3 illustrates a logic diagram that may be used within a DSP or μP to implement the present invention. At step 300, an in-phase signal component and a quadrature signal component are received. Upon receiving these signals, they are sampled to produce sampled in-phase signal components and sampled quadrature signal components 301. Having sampled the signals 301, the sampled in-phase signal components and/or the sampled quadrature signal components are shifted by a pre-determined phase angle to produce a shifted signal components 302. As mentioned above, it is a designer's choice as to shift one or both of the sampled signal components, and, in either case, the spirit of the present invention will be captured.

Having shifted the sampled signal components 302, the shifted signals, or at least a set of them, are compared with the opposite non-shifted sampled signals, or at least a set of them, 303. For example, if the sampled in-phase signal components had been shifted, the shifted in-phase signal components are compared with the sampled quadrature signal components. Likewise, if the sampled quadrature signal components are shifted, the shifted quadrature signal components are compared with the sampled in-phase signal components. In practice, only a set of shift signal components will be compared to a set of the opposite non-shifted sampled signal components, where the number of sample points in the set is based on the sampling rate of the samplers 205 206. For example, if the sampling rate of the samplers 205 206 is 4, then the number of sample points in the set will be 4, which allows for an entire period to be compared.

Having performed the comparison 303, a determination is made as to whether the signal components substantially match 304. If the signals substantially match 304, where substantially match is the resultant matching a predetermined tone detection level with a given tolerance, the tone detection is set 309 and the counter is incremented 310. If, however, the signals do not match 304, the tone detection is cleared 305. Having cleared the tone detection circuit, the counter is checked to determine its present count 306. If the present count exceeds a predetermined tone value, which may be 10 to 100 cycles, 307, the tone indication circuit indicates that a tone signal has been received and uses the count to determine the tone signal's duration 308. If the count is less than the predetermined tone value 307, the process repeats at step 300.

Figure 4:
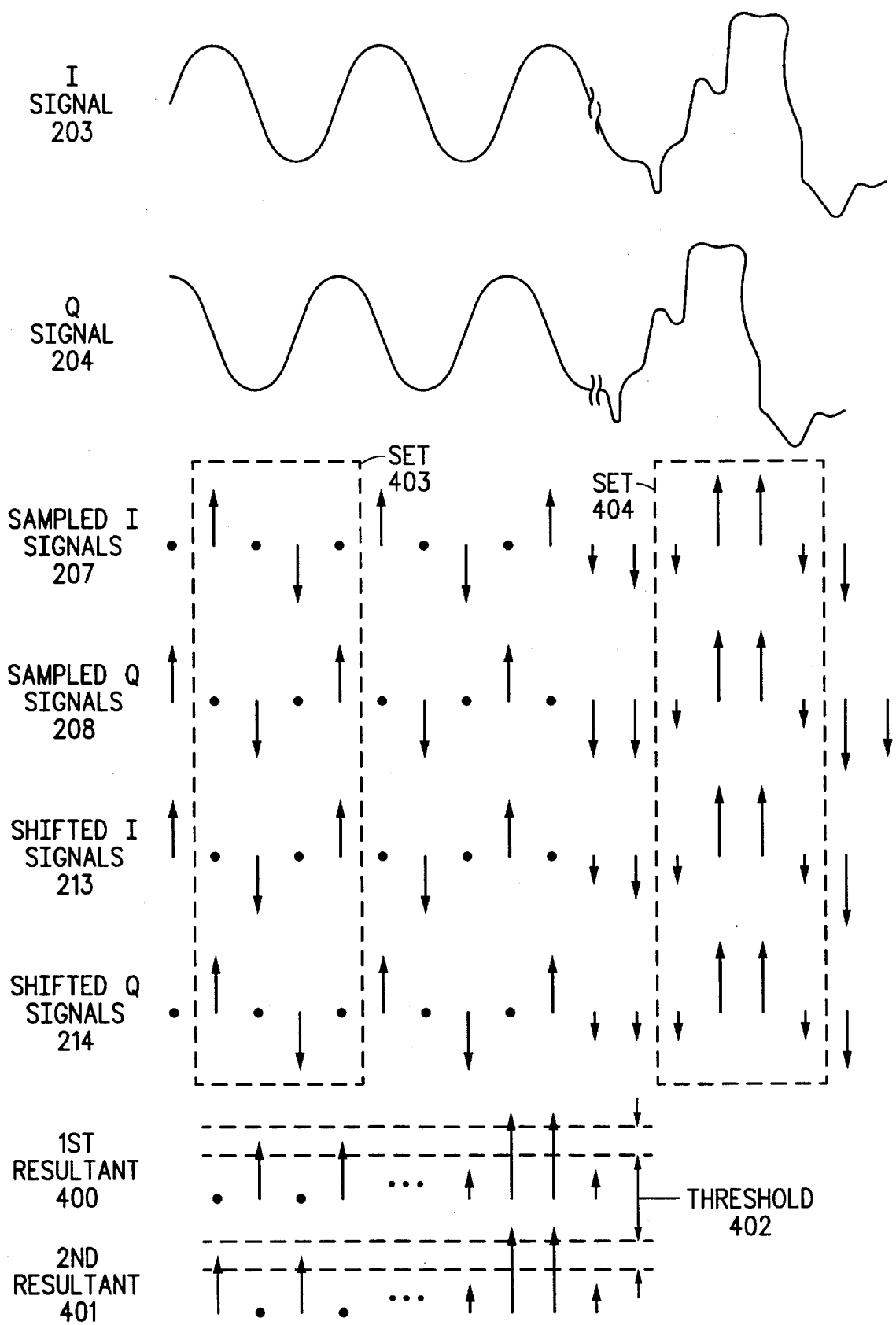
FIG. 4 illustrates a timing diagram of the tone detection circuit of FIG. 2.

FIG. 4 illustrates a timing diagram of the signals in the tone detection circuit of FIG. 2. The first line illustrates the in-phase signal component 203 of the input signal 201. The second line illustrates the quadrature signal component 204 of the input signal 201. As shown, the first few cycles of the in-phase signal component 203 and of the quadrature signal component 204 are sinusoidal signals, where the remaining cycles are complex sinusoidal signals that may represent speech. The third line depicts the sampled in-phase signal components 207 that are produced by the sampler 205 sampling the in-phase signal component 203 at a 4× sampling rate. The fourth line illustrates the sampled quadrature signal components 208 which are produced by the sampler 206 sampling the quadrature signal component 204 at a 4× sampling rate. The fifth and sixth lines illustrate the shifted in-phase signal components 213 and the shifted quadrature signal components 214, which are shifted, or delayed, by 90°, or π/2. Note that the predetermined phase angle used to shifted the sampled signals may be +/−nπ/2, where n is any integer. However, as the predetermined phase angle is changed from π/2, the polarity of the comparator 215 may need to be modified as well as the predetermined tone indication threshold.

The seventh line illustrates a first resultant 400, which is the resultant of comparing the shifted in-phase signal components with the corresponding sampled quadrature components, via the multiplier 219. The eighth line illustrates a second resultant 401, which is the resultant of comparing the shifted quadrature signal components with the sampled in-phase signal components via the multiplier 220. Also shown is a first set 402 and a second set 404, where there are four sample points in each set. As can be seen, the comparison of the signals in the first set 404 yield values that fall within the tone detection threshold 402, while the comparisons of the signals in the second set 404 yield values that do not fall within the tone detection threshold. Thus, the comparison of the first set 403 indicates that a tone signal is being received, while the comparison of the second set 404 indicates that a tone signal is not being received. Note that the first and second resultants 400 401 are summed together prior to making the comparison in the tone reception indicator 216.

Figure 5:
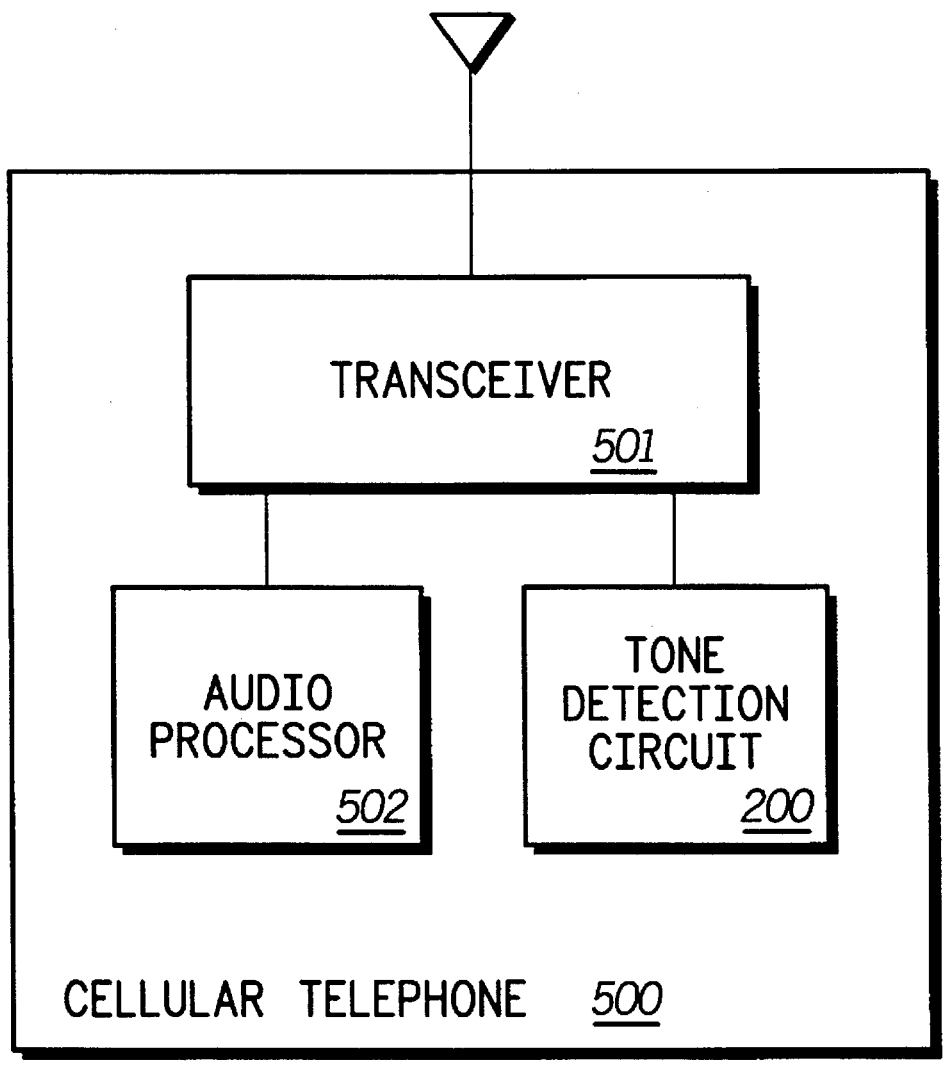
FIG. 5 illustrates a cellular telephone that incorporates the present invention.

FIG. 5 illustrates a cellular telephone 500 which incorporates the present invention. As shown, the cellular telephone 500 includes a transceiver 501 which is operably coupled to an audio processor 502 and a tone detection circuit 200. The tone detection circuit 200 is as described above and provides indication of reception of a tone signal. The transceiver 501 comprises a typical RF receiver and RF transmitter which are commonly used in cellular telephones. The audio processor 502 may be digital, analog, or combination audio processor.

In practice, the cellular telephone 500 utilizes the tone detection circuit 200 to indicate when a tone signal is being received. The tone signal is generally used as a frame header, which indicates the beginning of a time division multiplexing (TDM) frame. The tone signal may also contain operational data or other type of data.

Figure 1:
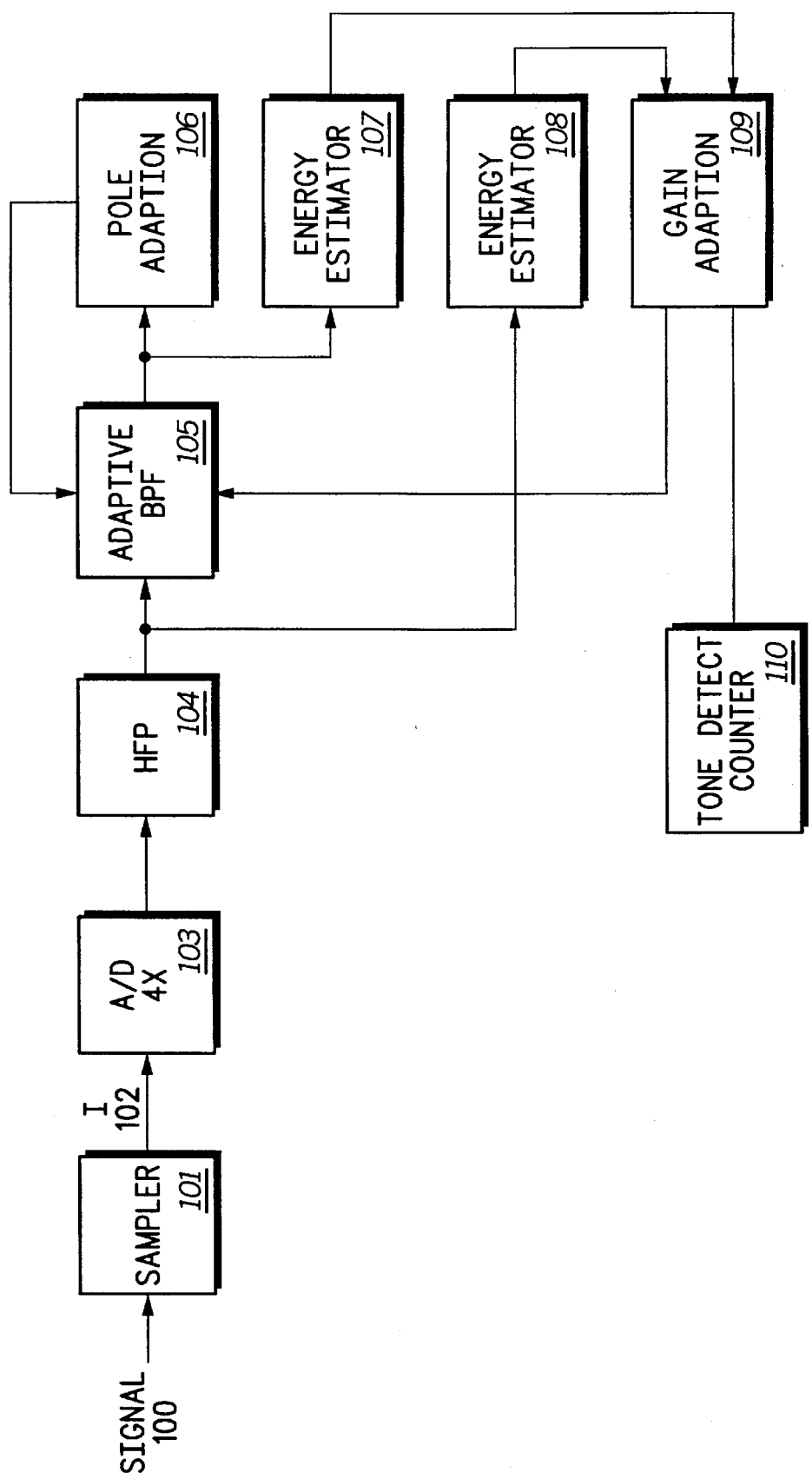
FIG. 1 illustrates a tone detection circuit of the prior art.

The present invention provides a method and apparatus for detecting reception of a tone signal. With such a method and apparatus, the number of processing cycles required to detect a tone signal is substantially reduced. For example, with the present embodiment, only 12 cycles are needed in comparison to the 90 required by the prior art circuit of FIG. 1. Because of the substantial reduction in processing steps required, the size of the DSP or microprocessor which implements the tone detection circuit is reduced thus reducing the cost of the circuit as well as the power consumption. For example the power consumption in the present embodiment is reduced to 1–3 mA from the 5–20 mA of the prior tone detection circuit.

We claim:

1. A method for detecting reception of a tone signal, the method comprising the steps of:

a) receiving an in-phase signal component and a quadrature signal component;

b) sampling the in-phase signal component with a first sampler to produce a plurality of sampled in-phase signal components;

c) sampling the quadrature signal component with a second sampler to produce a plurality of sampled quadrature signal components;

d) shifting the plurality of sampled quadrature signal components by a predetermined phase angle to produce a plurality of phase shifted quadrature components;

e) comparing a set of phase shifted quadrature components with a set of sampled in-phase signal components; and f) when each phase shifted quadrature component of the set of phase shifted quadrature components substantially matches each corresponding sampled in-phase signal component of the set of the sampled in-phase signal components, indicating that the tone signal is being received.

2. The method of claim 1, wherein step (d) further comprises:

1) multiplying a first phase shifted quadrature component with a first sampled in-phase signal component to produce a first resultant;

2) multiplying a second phase shifted quadrature component with a second sampled in-phase signal component to produce a second resultant, wherein the first phase shifted quadrature component immediately precedes the second phase shifted quadrature component; and 3) determining a difference between the first resultant and the second resultant.

3. The method of claim 2, wherein step (e) further comprises indicating that the tone signal is received when the difference substantially matches a predetermined value.

4. The method of claim 1 further comprises counting each indication of the tone signal being received.

5. The method of claim 1 further comprises, prior to shifting the plurality of sampled quadrature signal components, attenuating low frequency components of the plurality of sampled in-phase signal components and the plurality of sampled quadrature signal components.

6. The method of claim 1 further comprises scaling magnitudes of the plurality of sampled in-phase signal components and the plurality of sampled quadrature signal components prior to comparing the set of phase shifted quadrature components with the set of sampled in-phase signal components.

7. The method of claim 1, wherein step (b) further comprises sampling the in-phase signal component and the quadrature signal component at a rate of 4 times a signal that provides the in-phase signal component and the quadrature signal component.

8. A method for detecting reception of a tone signal, the method comprising the steps of:

a) receiving an in-phase signal component and a quadrature signal component;

b) sampling the in-phase signal component with a first sampler to produce a plurality of sampled in-phase signal components;

c) sampling the quadrature signal component with a second sampler to produce a plurality of sampled quadrature signal components;

d) shifting the plurality of sampled in-phase signal components by a predetermined phase angle to produce a plurality of phase shifted in-phase components;

e) comparing a set of phase shifted in-phase components with a set of sampled quadrature signal components; and f) when each phase shifted in-phase component of the set of phase shifted in-phase components substantially matches each corresponding sampled quadrature signal component of the set of the sampled quadrature signal components, indicating that the tone signal is being received.

9. A tone detection circuit comprising:

a first sampler that samples an in-phase signal component to produce a plurality of sampled in-phase signal components;

a second sampler that samples a quadrature signal component to produce a plurality of sampled quadrature signal components;

a signal shifter that shifts the plurality of sampled in-phase signal components by a predetermined phase angle to produce a plurality of shifted in-phase signal components;

a comparator that compares a set of phase shifted in-phase signal components with a set of the plurality of sampled quadrature signal components; and tone reception indicator, operably coupled to the comparator, that indicates when a tone signal is being received when each phase shifted in-phase signal component of the set of phase shifted in-phase signal components substantially matches each corresponding sampled quadrature signal component of the set of the plurality of sampled quadrature signal components.

10. The tone detector circuit of claim 9, wherein the comparator further comprises:

a first multiplier that multiples a first phase shifted in-phase signal component with a first sampled quadrature signal component to produce a first resultant;

a second multiplier that multiplies a second phase shifted in-phase component with a second sampled quadrature signal component to produce a second resultant, wherein the first phase shifted in-phase component immediately precedes the second phase shifted in-phase component; and a determiner that determines a difference between the first resultant and the second resultant.

11. The tone detector circuit of claim 9 further comprises a counter that counts each indication of the tone signal being received.

12. The tone detection circuit of claim 9 further comprises:

a first high pass filter operably coupled between the first sampler and the signal shifter; and a second high pass filter operably coupled between the first sampler and the signal shifter.

13. The tone detection circuit of claim 12 further comprises a scaler that is operably coupled to the first high pass filter, the second high pass filter, and the comparator, wherein the scaler scales magnitudes of the plurality of sampled in-phase signal components and the plurality of sampled quadrature signal components.

14. A method for a cellular telephone to detect a tone signal, the method comprising the steps of:

a) receiving an input signal;

b) converting the input signal in to an in-phase signal component and a quadrature signal component;

c) sampling the in-phase signal component with a first sampler to produce a plurality of sampled in-phase signal components;

d) sampling the quadrature signal component with a second sampler to produce a plurality of sampled quadrature signal components;

e) shifting the plurality of sampled quadrature signal components by a predetermined phase angle to produce a plurality of phase shifted quadrature components;

f) comparing a set of phase shifted quadrature components with a set of sampled in-phase signal components; and g) when each phase shifted quadrature component of the set of phase shifted quadrature components substantially matches each corresponding sampled in-phase signal component of the set of the sampled in-phase signal components, indicating that the tone signal is being received.

15. A cellular telephone comprising:

a transceiver;

an audio processor operably coupled to the transceiver;

a tone detection circuit, operably coupled to the transceiver, wherein the tone detection circuit includes:

a first sampler that samples an in-phase signal component to produce a plurality of sampled in-phase signal components;

a second sampler that samples a quadrature signal component to produce a plurality of sampled quadrature signal components;

a signal shifter that shifts the plurality of sampled in-phase signal components by a predetermined phase angle to produce a plurality of shifted in-phase signal components;

a comparator that compares a set of phase shifted in-phase signal components with a set of the plurality of sampled quadrature signal components; and tone reception indicator, operably coupled to the comparator, that indicates when a tone signal is being received when each phase shifted in-phase signal component of the set of phase shifted in-phase signal components substantially matches each corresponding sampled quadrature signal component of the set of the plurality of sampled quadrature signal components.

16. A tone detection circuit comprising:

a first sampler that samples an in-phase signal component to produce a plurality of sampled in-phase signal components;

a second sampler that samples a quadrature signal component to produce a plurality of sampled quadrature signal components;

a signal shifter that shifts the plurality of sampled quadrature signal components by a predetermined phase angle to produce a plurality of shifted quadrature signal components;

a comparator that compares a set of phase shifted quadrature signal components with a set of the plurality of sampled in-phase signal components; and tone reception indicator, operably coupled to the comparator, that indicates when a tone signal is being received when each phase shifted quadrature signal component of the set of phase shifted quadrature signal components substantially matches each corresponding sampled in-phase signal component of the set of the plurality of sampled in-phase signal components.

* * * * *